United States Patent [19]
Thurm

[11] Patent Number: 5,487,443
[45] Date of Patent: Jan. 30, 1996

[54] MOTORYCLE TORSION SUSPENSION SYSTEM

[76] Inventor: Kenneth R. Thurm, 2348 Rockridge Cir., Orange, Calif. 92667

[21] Appl. No.: 183,604

[22] Filed: Jan. 18, 1994

[51] Int. Cl.⁶ ................................................. B62K 25/12
[52] U.S. Cl. .......................... 180/227; 280/284; 267/273
[58] Field of Search ................................... 280/275, 283, 280/284, 285, 286, 721, 723, 700; 180/227, 219, 358; 267/278, 277, 274, 273, 154

[56]  References Cited

U.S. PATENT DOCUMENTS

| | | | |
|---|---|---|---|
| 2,705,154 | 3/1955 | Torre | 280/284 |
| 2,705,155 | 3/1955 | Torre | 280/284 |
| 3,337,236 | 8/1967 | Peterson | 280/723 |
| 3,966,006 | 6/1976 | Cullinan | 267/154 |
| 4,087,109 | 5/1978 | Davis | 280/284 |
| 4,463,824 | 8/1984 | Boyesen | 180/227 |
| 4,744,434 | 5/1988 | Miyakoshi et al. | 180/227 |
| 4,913,255 | 4/1990 | Takayanagi et al. | 180/227 |
| 5,360,078 | 11/1994 | Rifenburg et al. | 180/227 |

FOREIGN PATENT DOCUMENTS 0570183  6/1945  United Kingdom .................. 280/700

OTHER PUBLICATIONS

Copy of an article by Reg Kittrelle, entitled "A shocking tail of suspense", undated.
Copy of an article from European Dealer News, entitled "Harley–Davidson Announces Record Third Quarter Sales", Issue No. 3, Nov. 1993.
Copy of cover page of Hot Bike and article entitled "Sofspension For Softails", pp. 46–47, Jan. 1994.

Primary Examiner—Margaret A. Focarino
Assistant Examiner—Anne Marie Boehler
Attorney, Agent, or Firm—Knobbe, Martens, Olson & Bear

[57] ABSTRACT

A motorcycle rear wheel frame is pivotally mounted to the motorcycle main frame. A torsion bar is positioned on the pivot axis, with one end of the bar rotationally fixed with respect to the main frame. The other end of the bar is fixed to the rear frame so that pivotal movement of said rear frame with respect to the main frame is primarily absorbed by said torsion bar.

19 Claims, 5 Drawing Sheets

MOTORCYCLE TORSION SUSPENSION SYSTEM

FIELD OF THE INVENTION

The present invention relates in general to motorcycles and, more particularly, to motorcycle suspension systems.

BACKGROUND INFORMATION

Motorcycles generally consist of a main frame and a rear frame. This rear frame is commonly called a swing arm, although it is more than a single arm. The swing arm supports the rear tire of the motorcycle. A suspension system is typically used to attach the swing arm to the main frame. The suspension system permits independent vertical movement of the swing arm relative to the main frame. This independent movement allows the wheel to respond to road fluctuations and variances in terrain. The suspension system also prevents forces caused by bumps and jolts in the road from being transmitted to the main frame and rider. This improves the handling quality and riding comfort of the motorcycle.

A motorcycle suspension system commonly consists of an arm or fork extending from each wheel attachment point or wheel mount located on each side of the rear wheel. The axle of the rear wheel is connected to the wheel mounts. The rear wheel rotates about the axle on a wheel axis. The other ends of these arms are attached to the main frame by a suspension system in a manner that allows vertical movement of the arms relative to the main frame of the motorcycle. A typical suspension system includes many components such as arms, links, shock absorbers, springs, or torsion bars. These components are usually positioned between the arms and the main frame to permit the movement of the wheel relative to the main frame.

For example, U.S. Pat. No. 4,913,255 discloses a shock absorption system for motorcycles that includes a torsion spring. One end of the torsion spring is fastened to the lower frame of the motorcycle while the other end is fastened to the swing arm. A rotary dampener is also positioned between the swing arm and the frame. The torsion spring and the rotary dampener are physically positioned apart from each other, but they work in concert to form a suspension system. This device has the disadvantages of requiring a plurality of complex, interconnected, and exposed parts to form suspension system.

U.S. Pat. No. 4,463,824 discloses a suspension system for a motorcycle which employs a pair of arms located on each side of the rear wheel. These arms are connected at one end by a link to the wheel mount. The other end of the arms are attached to the main frame by another link in a manner to form a parallelogram. A torsion bar is connected at one end to the linked arms and the other end to the motorcycle frame. This device has the disadvantage of requiring a plurality of components and pivot points to create a suspension system.

There remains a need for a suspension system which is simple, easy to manufacture and install, and does not require a plurality of parts.

In addition, it is often highly desirable to have a suspension system that has no visible suspension components. Harley-Davidson is a well known motorcycle manufacturer that constructs a very popular type of suspension system under the Softail name. The Softail suspension has no suspension components exposed to view and is particularly designed to have the appearance of Harley-Davidson's "hard tail" frame. The "hard tail" frame consists of a pair of angularly extending arms joined to a wheel mount, with a wheel mount located on each side of the rear wheel. The arms are spaced from each other to allow clearance of the rear wheel. The other ends of the arms are connected directly to the frame strut of the motorcycle main frame. There is virtually no suspension system to absorb deflection of the rear wheel. Thus, all movement caused by the rear wheel hitting bumps in the road is transmitted to the main frame and the rider. This severely impairs the riding and handling qualities of the motorcycle.

The Harley-Davidson Softail suspension system attempts to mimic the appearance of the "hard tail" frame while improving the riding quality and comfort of the motorcycle by incorporating a suspension system. Instead of connecting the arms extending from the wheel mounts directly to the frame, each arm is attached to a connector. The connectors have the same general size and shape as the frame struts of the main frame. Each connector is positioned adjacent and inside a corresponding frame strut so they are hidden from view. The connectors are pivotally attached to the frame struts along a pivot axis. The connectors pivot about a simple shaft or swing axle tube which extends along the pivot axis. The pivot axis is generally located near the center of the connectors. The connectors are attached to each other by upper and lower transverse cross members at the respective ends of the connectors. The Softail suspension does not alter the aesthetics of the "hard tail" frame because the connectors are hidden from view by the frame struts.

The Softail suspension system requires the use of two shock absorbers mounted parallel to the bottom of the motorcycle main frame. The shock absorbers are hidden from view when mounted in this location. One end of each shock absorber is attached to the main frame and the other end is connected to a projection, extending forwardly from the lower transverse cross member of the swing arm. The projection is adapted to receive a bolt or pin which connects the shock absorber to the projection. The main frame of the motorcycle hides the projection from view. Therefore, this arrangement and location of the shock absorbers and projection retains the image of no suspension system, which preserves the highly desirable appearance of a Harley-Davidson "hard tail" frame.

The Softail suspension system affords significant advantages over the "hard tail" frame by providing for some suspension cushioning that improves the handling and riding comfort of the motorcycle. However, significant disadvantages remain because the Softail suspension system is insufficient. For example, a harsh and uncomfortable ride remains because of the very short travel of the shock absorbers. The shock absorbers have a very short travel because of the design and geometry of the Harley-Davidson motorcycle frame. The rear wheel can only move a maximum of two inches in either vertical direction before the swing arm contacts the main frame. Thus, the maximum vertical movement of the rear wheel relative to the main frame is limited.

The shock absorbers, however, have an even smaller maximum travel of 1.5 inches, 0.75 inches in either direction from a center position. As described above, the shock absorbers are attached to the lower portion of the main frame and to a projection extending from the lower transverse cross member of the swing arm. The pivot axis is about 16 inches forward of the wheel axis. The distance between the pivot axis and the shock attachment point of the projection is only about 5 inches, and that attachment point is about ½ inch forward from the pivot axis. The result of this is that while the rear wheel may travel two inches in one direction from a centered position, the shock absorbers can only travel a distance of about 75 inches.

The limited distance of travel of the shock absorbers results in a hard, uncomfortable ride because any shock absorption must occur within this narrow range of movement. The short distance of travel mandates continual and rapid changes of the shock absorber shaft according to the movement of the wheel. These directional changes, however, are delayed because of the inherent reluctance of the shock absorber to rapidly change directions. Shock absorbers have intrinsic parasitic and inertial drag caused by the movement of the oil or gas within the shock absorber, friction and "sticktion" caused by the seals and o-rings, and relatively large momentum forces. Thus, the Harley-Davidson Softail suspension has significant disadvantages because its suspension system is inadequate.

Previous attempts to improve the Softail suspension system have occurred. For example, the travel distance of the shock absorbers has been increased. However, this solution offers only a modest improvement because the range of movement of the swing arm is limited by the motorcycle frame. The maximum deflection of the rear wheel occurs when the swing arm contacts the frame. Because the shock absorber is also attached to the swing arm, its amount of travel is similarly limited. Any further increases in the shock absorber travel require modifications to the motorcycle main frame, which is very undesirable. Additionally, attempts have been made to improve the responsiveness of the shock absorbers, however, these attempts are hindered by drag and friction forces discussed above.

Therefore, there remains a need for a motorcycle suspension system that is largely not visible and does not have the above-described significant disadvantages.

SUMMARY OF THE INVENTION

In order to overcome the above-stated problems and limitations, a motorcycle suspension system is provided which includes a torsion bar for shock absorption. The rear frame or swing arm includes two pairs of arms, one pair located on each side of the rear wheel. These arms are joined at one end to the wheel mount. The other ends of the arms are joined to left and right connectors respectively. These connectors are joined by upper and lower transverse cross members to form the swing arm. The connectors are pivotally mounted near the center of the frame struts of the motorcycle main frame. The connectors are located along a pivot axis so that they are adjacent and parallel to the frame struts.

In the preferred embodiment, the suspension system comprises a torsion bar located along the pivot axis. As described above, the swing arm of the Harley-Davidson Softail suspension system pivots about a swing axle tube located along the pivot axis. The Harley-Davidson swing axle tube is replaced by the torsion bar of the present invention. One end of the torsion bar is fixed to the main frame. The other end of the bar is "floating" or rotatably attached to the main frame. This end of the bar is also rigidly connected to a torsion bar arm which extends perpendicular to the bar. The other end of the torsion bar arm is securely attached to the swing arm. Any movement of the swing arm, caused by movement of the wheel, imparts a force on the torsion bar because the bar is securely fastened to the swing arm by the torsion bar arm. Because the other end of the torsion bar is fixed to the main frame, the bar must twist to absorb the force or torque. This twisting motion is preferably resisted by the bar exponentially, i.e., as the force on the bar increases, the bar exponentially resists the force. When the force is removed, the bar returns the swing arm to its original position.

In particular, the present invention eliminates the need for shock absorbers, which are required in the Harley-Davidson Softail suspension system, because the torsion bar controls the movement of the swing arm. The torsion bar does not have the above-described deficiencies because it lacks the inherent drag and friction forces that shock absorbers possess. Additionally, the inertial forces are far less on the torsion bar than those experienced by the shock absorbers because the torsion bar is placed at or near the fulcrum point of the suspension system. Further, unlike conventional shock absorbers, the torsion bar does not have to be periodically replaced since the bar does not wear out.

Preferably, a torsion bar is selected that allows at least 14 degrees of rotation because the wheel axis can deflect a maximum of 14 degrees relative to the pivot axis. Most preferably, a torsion bar that permits up to 22 degrees of rotation is selected. The degree to which the bar resists the twisting motion is dependent upon the diameter and material of the bar.

The present invention provides a suspension system with significantly improved riding and handling characteristics. As previously indicated, the shock absorbers required in a Harley-Davidson Softail suspension system have a maximum travel of 0.75 inches in one direction from a centered position. This causes an uncomfortable ride because the shock absorbers must continually and rapidly change directions within this limited range of motion. Further, the shock absorbers have a delayed reaction to these directional changes because they are intrinsically limited by factors such as friction and drag. In contrast, the torsion bar of the present invention offers significant advantages because its reaction to movement of the swing arm is minimally effected by friction and drag forces. This allows the suspension system of the present invention to react quicker, which creates a softer, more controlled, and superior suspension system.

The present invention provides a simple, light weight means of improving a motorcycle suspension system. The present invention is inexpensive to manufacture, efficient in operation, and has no visible suspension components to maintain the highly desirable appearance of a Harley-Davidson "hard tail" frame. Further, the present invention can be sold as a kit to modify existing suspension systems. The invention is a simple, bolt-on modification that is particularly adapted to Harley-Davidson Softail suspension system, but it can be fitted to other motorcycle suspension systems.

The foregoing and other objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of accompanying drawings which:

DETAILED DESCRIPTION OF THE PREFERRED EMBODIMENT

Figure 1:
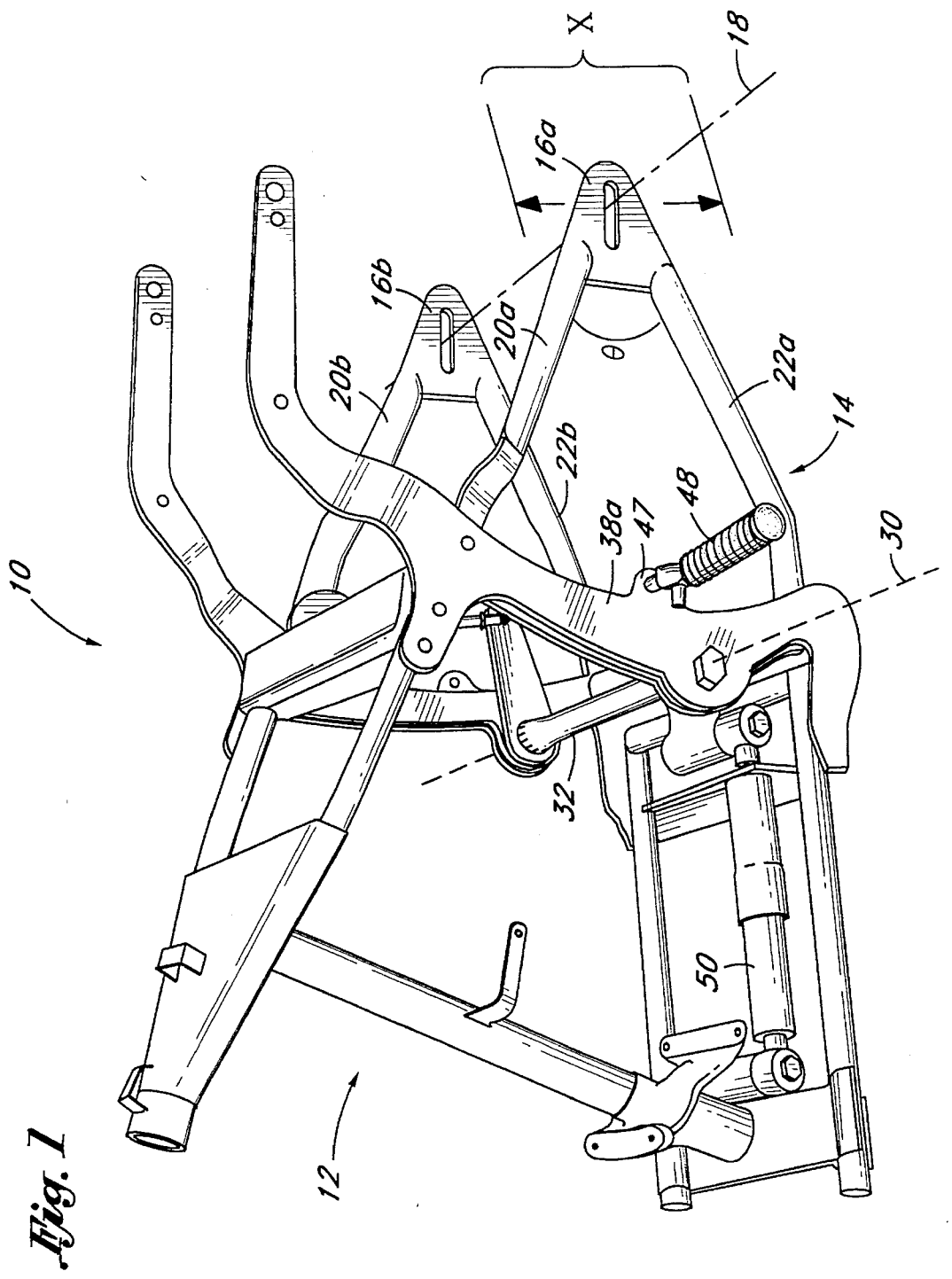
FIG. 1 is a side perspective view of a preferred embodiment of the present invention of the motorcycle suspension system.

As shown in FIG. 1, a motorcycle suspension system 10 includes a main frame 12 and a rear frame or swing arm 14.

Figure 2:
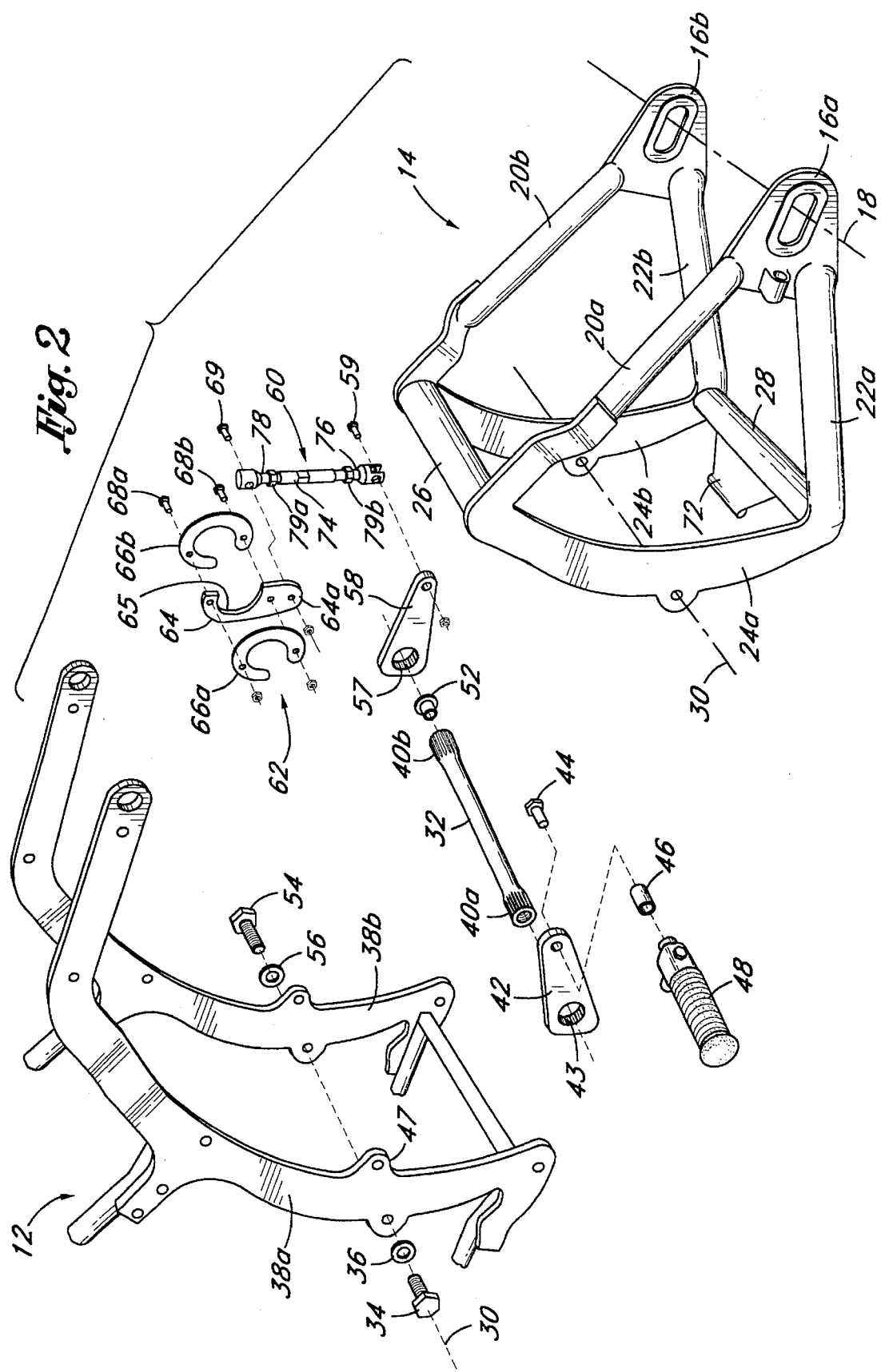
FIG. 2 is a side exploded view of the motorcycle suspension system of FIG. 1.

As seen in FIG. 2, swing arm 14 includes wheel mounts 16a and 16b. Attached to wheel mounts 16a and 16b, about wheel axis 18, is a wheel (not shown) as is well known in the art. Extending from each wheel mount 16a and 16b are upper arms 20a and 20b and lower arms 22a and 22b, respectively. These arms are arranged in side-by-side parallel pairs that are spaced from each other to accommodate the wheel. These arms extend from the wheel mount at an angle θ, which in the arrangement shown, is about 45 degrees. The other ends of these arms are joined to connectors 24a and 24b, wherein upper arms 20a and 20b are attached to the upper end of connectors 24a and 24b, respectively, and lower arms 22a and 22b fastened to the lower end of the connectors 24a and 24b respectively. Upper transverse cross member 26 joins the upper end of the connectors 24a and 24b while lower transverse cross member 28 joins the lower end of connectors 24a and 24b.

As illustrated in FIG. 1, connectors 24a and 24b of the swing arm 14 are pivotally mounted along pivot axis 30 to the main frame 12. Pivot axis 30 is preferably located near the center of connectors 24a and 24b. Pivot axis 30 allows relative movement between swing arm 14 and main frame 12. As seen in FIG. 1, wheel axis 18 can move within a range of motion. This is about four inches with the Harley-Davidson Softail suspension system.

Figure 3:
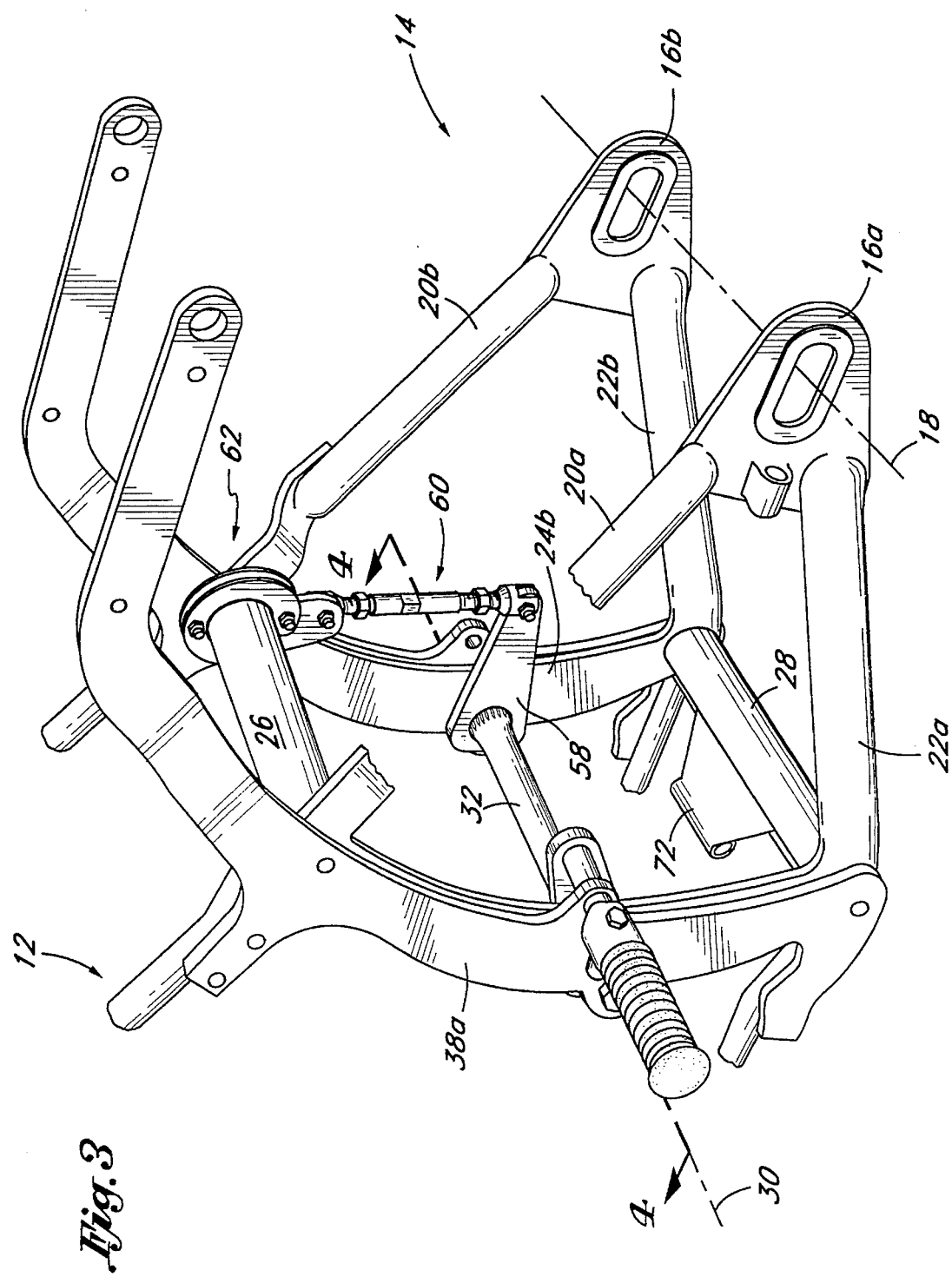
FIG. 3 is an end cut-away perspective view of the motorcycle suspension system of FIG. 1.

As seen in FIGS. 2 and 3, torsion bar 32 is mounted concentrically with pivot axis 30. One end of torsion bar 32 is rigidly attached to one side of main frame 12, preferably the left side. A preferred method is to use a swing arm pivot bolt 34 which passes through washer 36, frame strut 38a, and connector 24a. Pivot bolt 34 is threaded into one end of torsion bar 32. This end of the torsion bar 32 has exterior splines 40a adapted to receive a splined opening 43 on one end of short arm 42. A shoulder (not shown) may control the location of arm 42 relative to torsion bar 32. The other end of arm 42 is connected to the main frame 12 by a bolt 44 to the left side of main frame 12. Preferably, arm 42 is about four inches in length and is connected to main frame 12 at projection 47 extending rearwardly from frame strut 38a, wherein foot peg 48 is commonly attached. Bolt 44 passes through arm 42, spacer 46, and is connected to foot peg 48. Foot peg 48 may be used as a foot rest for the motorcycle rider. Foot peg 48 is pivotally mounted so that it can be pivoted upwardly and adjacent frame strut 38a when not in use.

Figure 4:
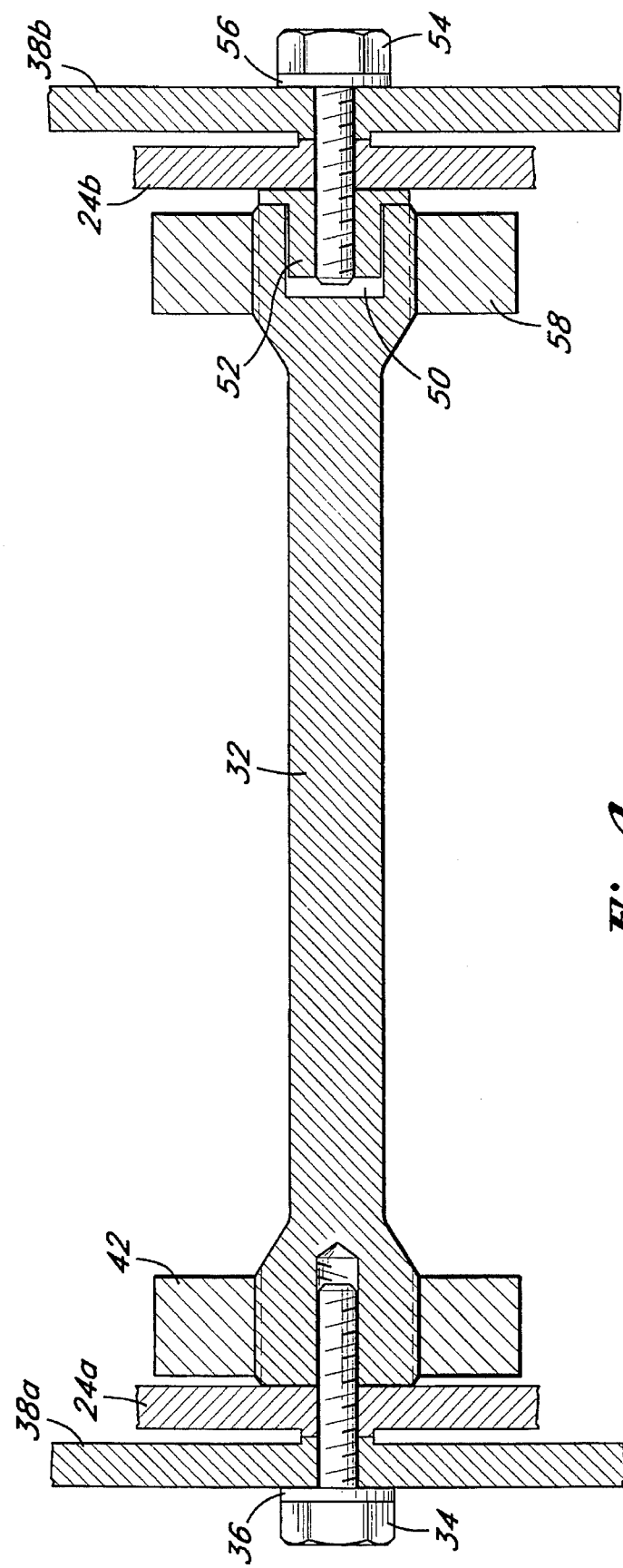
FIG. 4 is a cross section view along 4—4 of the motorcycle suspension system shown in FIG. 3.

The other end of torsion bar 32 is rotatably connected to main frame 12. This end has splines 40b located on the outer periphery. As seen in further detail in FIG. 4, torsion bar 32 has a socket or recess, generally shown at 50. Inside socket or recess 50 is a "floating nut" or bushing 52. Bushing 52 is threaded to receive swing arm pivot bolt 54 along pivot axis 30. This creates an anti-friction engagement between the main frame 12 and one end of the torsion bar 32, preferably the right side. Bolt 54 is connected to bushing 52 through washer 56, frame strut 38b, and connector 24b. Splines 40b are spline connected to a splined opening 57 on one end of torsion bar arm 58. A shoulder (not shown) may control the location of torsion bar arm 58 relative to torsion bar 32. Torsion bar arm 58 is slightly larger than strut arm 42, preferably about five inches in length.

In the presently preferred embodiment, a linkage, generally shown at 60, joins the other end of the torsion bar arm 58 to upper transverse cross member 26 of swing arm 14. However, it will be readily appreciated that linkage 60 may be attached to a variety of locations on swing arm 14. Linkage 60 may be attached to swing arm 14 in a variety of methods. A preferred method is by means of clamp 62. As seen in FIGS. 2 and 3, clamp 62 comprises curved members shaped like a "C". A flat central curved member 64 has an opening 65 facing the rear wheel of the motorcycle and a radial extension 64a. Two flat parallel C-shaped members 66a and 66b are located on opposite sides of the central member 64. Central member 64 is connected to the outer members 66a and 66b by means such as fasteners 68a and 68b, which extend through holes in the clamp members. The radial extension 64a of the central member 64 is connected to linkage 60 by means such as fastener 69.

Linkage 60 is preferably adjustable in length, and is a known turnbuckle type comprising an adjustor tube or sleeve 74 and threaded rods 76 and 78. One end of threaded rod 76 is connected to torsion bar arm 58 by means such as fastener 59 and the other end contains external threads. The other threaded rod 78 is connected to the extension 64a of the flat central member 64 of clamp 62. The external threads of rods 76 and 78 mesh with the internal threads of sleeve 74. Rotating sleeve 74 varies the length of linkage 60. This changes the ride height of the motorcycle by varying the relationship of wheel axis 18 to pivot axis 30. Nuts 79a and 79b threaded against sleeve 74 hold the linkage 60 in its adjusted position.

Figure 5:
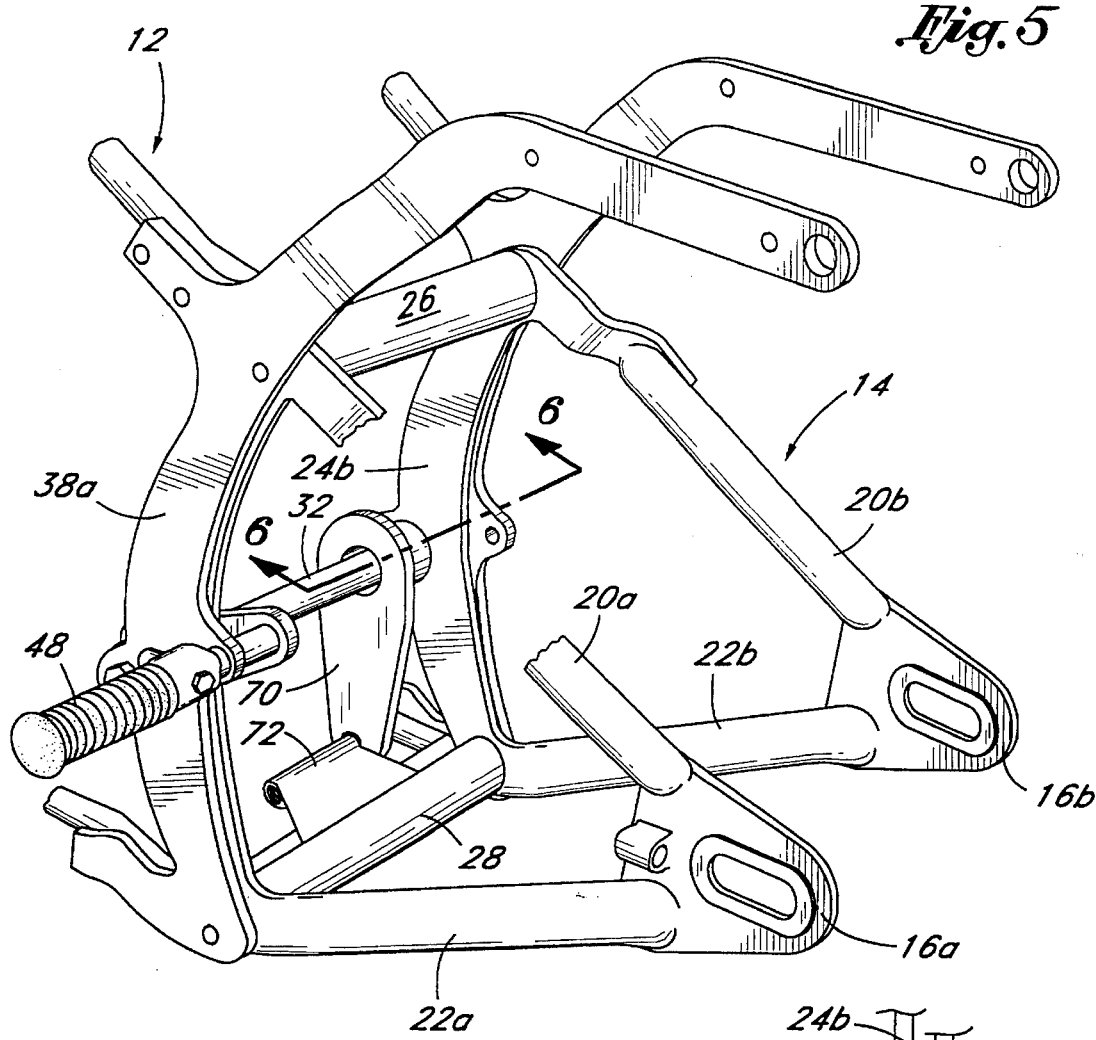
FIG. 5 is an end cut-away perspective view showing an alternative embodiment of the motorcycle suspension system of FIG. 1.
Figure 6:
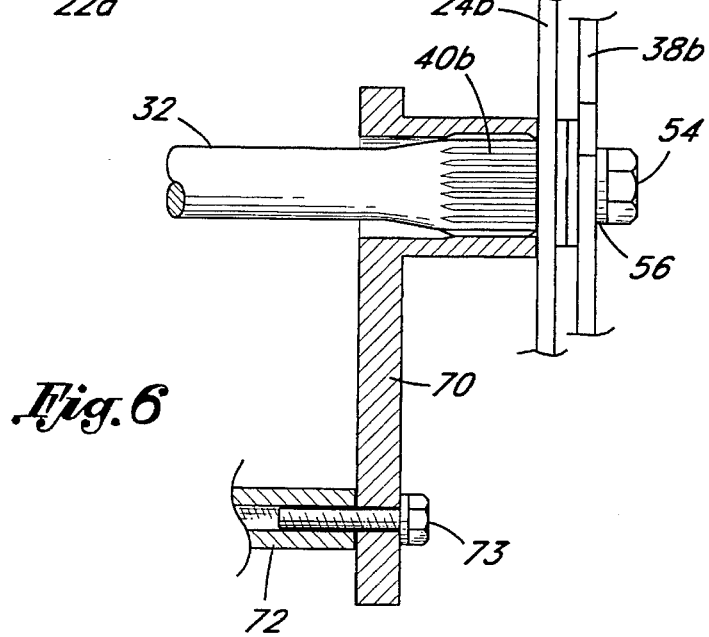
FIG. 6 is a cross section view along 6—6 of the motorcycle suspension system shown in FIG. 5.

In another preferred embodiment, seen in FIGS. 5 and 6, torsion bar 32 is spline connected to a splined end of arm 70. The outer end of the arm 70 is connected to projection 72 extending forwardly from lower transverse cross member 28. Arm 70 is connected to projection 72 by means such as bolt 73.

As illustrated in FIG. 1, the suspension system 10 preferably includes a dampener 80. However, dampener 80 is not a supporting member and is not required. One end of a suitable dampener 80 is attached to the forward end of main frame 12. The other end of dampener 80 is connected to projection 72 extending forwardly from lower transverse cross member 28. Dampeners, as known in the art, are used to dampen movement. Preferably, dampener 80 only dampens movement during rebound or while the swing arm 14 is returning to its original position. Dampener 80 may be obtained from a manufacturer such as Bilstein of Germany, distributed in San Diego, Calif. Dampener 80 is lighter in weight and smaller in size than the two shock absorbers used in the Harley-Davidson Softail suspension system. This decreases the weight of the motorcycle and leaves additional space for the installation of other components.

The locations of the components of the suspension system 10 can be reversed without deviation from the scope of the invention. For example, the right end of the torsion bar 32 could be firmly attached to the main frame 12 without deviating from the scope of the invention. Further, other types of connections between the components may be utilized. The presently preferred embodiment uses spline connections between torsion bar 32 and both the short arm 42 and torsion bar arm 58 because they permit non-rotatable connections. The spline connections facilitate the accurate mounting of the arms at different angles relative to torsion bar 32 and pivot axis 30. In addition, these angles can be adjusted in small increments. The outer ends of the arms can be attached to different portions of the main frame 12 and/or the torsion bar 32 can be attached so that it is twisted or subject to force in its unloaded state. Finally, the suspension system 10 can be adjusted by varying the diameter or material of the torsion bar 32.

I claim:

1. A suspension system for a motorcycle, comprising:

a frame;

a swing arm pivotally mounted to said frame on a pivot axis, said swing arm having a pair of wheel mounts located on a wheel axis spaced to receive a wheel, a pair of arms extending from each of said wheel mounts, a connector connecting each said pair of arms, each connector being joined to the other connector by an upper transverse cross member and a lower transverse cross member; and a torsion bar extending along said pivot axis, said torsion bar being rigidly connected at a first end to said frame and being connected at a second end to said swing arm wherein said frame substantially covers said connectors and said torsion bar from a side view of said motorcycle.

2. The suspension system of claim 1, including a short arm having one end secured to said torsion bar and the other end secured to the frame.

3. A suspension system for a motorcycle, comprising:

a frame;

a swing arm pivotally mounted to said frame on a pivot axis, said swing arm having a pair of wheel mounts located on a wheel axis spaced to receive a wheel, a pair of arms extending from each of said wheel mounts, a connector connecting each said pair of arms, each connector being joined to the other connector by an upper transverse cross member and a lower transverse cross member;

a torsion bar extending along said pivot axis, said torsion bar being rigidly connected at a first end to said frame and being connected at a second end to said swing arm; and a short arm having one end secured to said torsion bar and the other end secured to the frame wherein said short arm is secured to a projection extending rearwardly from a frame strut where a foot peg is attached.

4. The suspension system of claim 1, wherein said second end of said torsion bar is rotatably connected to said frame.

5. A suspension system for a motorcycle, comprising:

a frame a swing arm pivotally mounted to said frame on a pivot axis, said swing arm having a pair of wheel mounts located on a wheel axis spaced to receive a wheel, a pair of arms extending from each of said wheel mounts, a connector connecting each said pair of arms, each connector being joined to the other connector by an upper transverse cross member and a lower transverse cross member;

a torsion bar extending along said pivot axis, said torsion bar being rigidly connected at a first end to said frame and being connected at a second end to said swing arm, wherein said second end of said torsion bar is rotatably connected to said frame; and a bushing having internal threads for receiving a mounting bolt, said bushing having an exterior which freely rotates within said second end of said torsion bar to create the rotatable connection to said frame.

6. The frame suspension system of claim 5, comprising a swing arm pivot bolt located on said pivot axis adapted to thread into said internal threads of said bushing which connects said frame, said swing arm, and said torsion bar.

7. The suspension system of claim 5, comprising a torsion bar arm having one end secured to said second end of said torsion bar.

8. The suspension system of claim 7, comprising a linkage joining said torsion bar arm to said swing arm.

9. The suspension system of claim 8, wherein said linkage is adjustable in length.

10. The suspension system of claim 8, wherein said torsion bar arm is connected by said linkage to said upper transverse cross member.

11. The suspension system of claim 7, comprising a projection extending forwardly from said lower transverse cross member, said projection being connected to said torsion bar arm.

12. The suspension system of claim 1, including a dampener attached to a lower portion of said frame and to a projection extending forwardly from said lower transverse cross member.

13. A suspension system for a motorcycle, comprising:

a frame having spaced, parallel first and second struts;

a swing arm pivotally mounted to said frame on a pivot axis that extends through said struts, said swing arm having first and second wheel mounts located on a wheel axis spaced to receive a wheel, a first pair of arms extending from said first wheel mount, a second pair of arms extending from said second wheel mount, said first pair of arms attaching to a first connector, said second pair of arms attaching to a second connector, an upper transverse cross member and a lower transverse cross member joining said first connector to said second connector, said first connector being pivotally mounted adjacent said first strut along said pivot axis, said second connector being pivotally mounted adjacent said second strut along said pivot axis;

a torsion bar extending along said pivot axis, said torsion bar having a first end with an internally threaded portion, a first swing arm pivot bolt located along said pivot axis and passing through said first strut and said first connector being threaded into said threaded portion of said torsion bar, said first end having splines located on the outer periphery, said second end with an axially opening recess, a bushing rotatably mounted within said recess, a second swing arm pivot bolt located along said pivot axis and passing through said second-strut and said second connector and being threaded into said bushing, said second end having exterior splines;

a short arm having two ends, one end spline connected to said first end of said torsion bar and the other end rigidly connected to said frame;

a torsion bar arm having two ends, one end spline connected to said second end of said torsion bar; and a linkage having a first end connected to the other end of said torsion bar arm and said linkage having a second end connected to said upper transverse cross member, said linkage being adjustable in length.

14. A suspension system for a motorcycle, comprising:

a rear frame pivotally mounted to said main frame on a pivot axis, said rear frame having wheel mounts spaced to receive a rear wheel;

a torsion bar extending along said pivot axis;

a main frame arm connecting one end of said bar to said main frame in a manner to prevent said bar end from rotating; and a torsion bar arm having one end rotationally fixed to an opposite end of said torsion bar and an opposite end of said torsion bar arm linked to said rear frame in a manner such that pivoting movement of said rear frame produces torque on said torsion bar to control said pivoting movement wherein said main frame substantially covers said torsion bar from a side view of said motorcycle.

15. A suspension system for a motorcycle, comprising:

a main frame;

a rear frame pivotally mounted to said main frame on a pivot axis, said rear frame having wheel mounts spaced to receive a rear wheel;

a torsion bar extending along said pivot axis;

a main frame arm connecting one end of said bar to said main frame in a manner to prevent said bar end from rotating; and a torsion bar arm having one end rotationally fixed to said main frame and an opposite end of said torsion bar linked to said rear frame in a manner such that pivoting movement of said rear frame with respect to said main frame produces torque on said torsion bar to control said pivoting movement; and an adjustable linkage connecting said torsion bar arm to said rear frame in a manner to adjust the angular position of said rear frame with respect to said main frame.

16. A suspension system for a motorcycle, comprising:

a main frame;

a rear frame pivotally mounted to said main frame on a pivot axis, said rear frame having wheel mounts spaced to receive a rear wheel;

a torsion bar extending along said pivot axis;

a main frame arm connecting one end of said bar to said main frame in a manner to prevent said bar end from rotating; and a torsion bar arm having one end rotationally fixed to said main frame and an opposite end of said torsion bar linked to said rear frame in a manner such that pivoting movement of said rear frame with respect to said main frame produces torque on said torsion bar to control said pivoting movement; and a mounting bolt on said axis extending through portions of said frames and threaded into one end of said torsion bar, and a mounting bolt extending through other portions of said frames and into a threaded bushing, said bushing being rotatably mounted in an opposite end of said torsion bar.

17. A method of creating a motorcycle suspension system with a frame and a swing arm, comprising:

pivotally mounting said swing arm to said frame along a pivot axis;

attaching a first end of a torsion bar to said frame by a pivot axis bolt;

connecting said first end of said torsion bar to said frame to prevent rotation of said first end;

inserting a bushing into a recess within a second end of said torsion bar;

rotatably connecting said second end of said torsion bar to said frame by means of a bolt and said bushing;

connecting said second end of said torsion bar to a torsion bar arm;

attaching said torsion bar arm to an adjustable linkage; and joining said adjustable linkage to said swing arm.

18. A method of converting a suspension system on a motorcycle to an improved suspension system, said system employing a pair of shock absorbers extending between a main motorcycle frame and a rear wheel frame, said rear frame being joined to said main frame on a pivotal axis by means of a pair of spaced mounting bolts, each extending through spaced portions of said frames and threaded into a connecting tube extending between said spaced portions, said method comprising:

removing said shock absorbers;

replacing said connecting tube with a torsion bar, including threading one of said mounting bolts into a threaded end of said torsion bar and threading the other one of said connecting bolts into a threaded bushing that is rotatably mounted in a recess on the opposite end of said torsion bar;

rotationally fixing said threaded end of said torsion bar to said frame so that said threaded end of said torsion bar cannot rotate with respect to said frame; and rotationally fixing said opposite end of said torsion bar to said rear frame so that pivoting movement of said rear frame with respect to said main frame is absorbed by said torsion bar.

19. The method of claim 18, including connecting a damper between said frames to dampen pivoting movement of said rear frame.

* * * * *